Nov. 24, 1970  G. A. FISHER ET AL  3,543,068

COMMUTATOR BRUSH ASSEMBLY

Filed Nov. 18, 1968

INVENTORS

GENE A. FISHER
ADOLFO M. GUZMAN
JOHN P. HARRIS
PAUL Y. HU

BY

ATTORNEY

United States Patent Office 3,543,068
Patented Nov. 24, 1970

3,543,068
COMMUTATOR BRUSH ASSEMBLY
Gene A. Fisher, Adolfo M. Guzman, John P. Harris, and Paul Y. Hu, Boulder, Colo., assignors to International Business Machines Corporation, Armonk, N.Y., a corporation of New York
Filed Nov. 18, 1968, Ser. No. 776,569
Int. Cl. H01r 39/38; H02k 13/00
U.S. Cl. 310—244
13 Claims

ABSTRACT OF THE DISCLOSURE

A commutator brush assembly capable of following a commutator surface subject to rapid pitch, roll, and yaw motions, as well as rapid movements toward and away from the brush. The assembly comprises a low profile brush supported by a universal pivot joint at the end of a cantilevered leaf spring. The leaf spring is rigidly supported remote from the brush and accommodates bodily displacement of the brush radially with respect to the commutator by flexing. Pitch, roll, and yaw motions are accommodated by the pivot joint.

SUMMARY OF THE INVENTION

The present invention relates to rotating electrical machinery and, more particularly, to commutator brush devices for such machinery.

The art relating to rotating electrical equipment has developed over a substantial number of years and reached a state of substantial stability some time ago. In recent years, however, new developments in motor and generator design have taken place and have reopened many facets of the art for further study. Among the relatively recent developments is that of the extremely low inertia, fast response rotating machine, usually characterized by a low mass, iron-free armature element. Machines of this sort require extremely efficient commutation if they are to operate at maximum performance capabilities. Commutation efficiency during acceleration and deceleration is particularly critical since the response of the machine is dependent upon the ability to pass the required electrical energy across the commutation interface.

In addition to the problems associated with the high acceleration/deceleration characteristics of current equipment, further problems in commutation are created by the low inertia design of the equipment. Rather than having the structurally rigid commutator assemblies familiar in the prior art, this equipment employs light weight and usually thin walled tubular structures for commutation which do not have this structural rigidity. In fact, it is common to provide commutation directly upon the windings of the low inertia armature element. The commutator brushes are required to slide against a surface which is pitching, rolling, and yawing, in addition to moving rapidly toward and away from the brush. The commutation techniques provided in the prior art are not wholly capable of meeting the energy transfer efficiency needed in this kind of environment. Traditional commutator brush holders either support the brush at the end of a pivoted arm, or in a sleeve with spring means to press it against the commutator. In either case, substantial frictional forces exist to resist free movement of the brush to follow movements of the commutator surface in the radial direction. Consequently, loading is uneven, at best; and rapid movements of the surface, caused by "out of round" irregularities in the commutation element, can produce lift-off of the brush with consequent arcing and loss of energy transfer. An additional problem with conventional brush holders is that the brush is unable to faithfully follow the pitch, roll, and yaw of the commutator surface so that less than full surface contact is achievable. This produces uneven wear on the brush, in addition to lowering the energy transfer efficiency. Uniform energy transfer in both directions of commutator rotation is also difficult to achieve, particularly in view of the uneven wear situation.

It is the purpose of this invention to provide a commutator brush assembly for rotating electrical equipment that avoids the problems mentioned above and provides efficient energy transfer between the stationary and rotatable elements of the machine under all operating conditions, including bi-directional rotation.

More specifically, it is the object of this invention to provide a commutator brush assembly which provides for uniform loading of the brush against the commutator surface in the presence of rapid movements of the surface toward and away from the brush, and which provides the capability of following pitch, roll, and yaw movements of the commutator surface by the entire brush operating surface.

The assembly provided in accordance with this invention enjoys the advantages of extremely low mass, long brush life, and simplicity of design and manufacture. Its unique design also permits simple insertion and removal from the machine for assembly, inspection, and replacement.

The foregoing and other objects, features, and advantages of the invention will be apparent from the following more particular description of preferred embodiments of the invention, as illustrated in the accompanying drawings.

DETAILED DESCRIPTION

Figure 1:
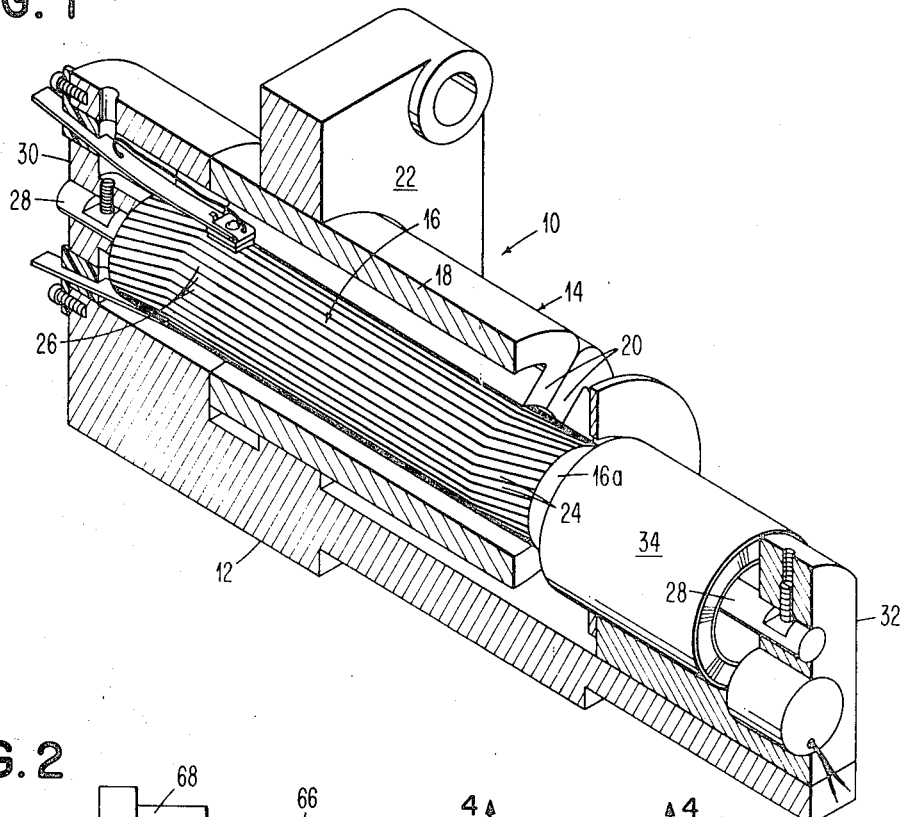
FIG. 1 is a perspective illustration, partially in section, of a low inertia, fast response motor employing brush assemblies provided in accordance with this invention.

Referring now in detail to the drawings, there is shown, in FIG. 1, a low inertia, fast response motor 10 of the sort to which this invention is particularly well adapted. The motor 10 includes a housing 12 which supports the several motor elements, including a stator unit 14 and an armature 16. As may be seen, the stator consists of a plurality of permanent magnets 18 having their poles 20 juxtaposed and facing inwardly toward the armature 16. The stator magnets 18 are supported in an upstanding collar 22 on frame 12. The armature 16 comprises a thin walled tube of insulating material, such as epoxy filled fiberglass, having armature windings 24 obtained thereon by printed circuit techniques. Though not clearly shown in the drawing, the windings 24 are continuous, being formed both on the inner and outer surfaces of the tube. A portion 26 of each winding segment on the outer surface of the armature is used as a commutator segment.

The armature 16 is mounted for free rotation on a shaft 28 fixed to upstanding end supports 30 and 32 at the opposite end of the frame 12 and extending through the stator 14. Bearings (not shown), mounted on shaft 28, support the armature 16 at spaced points.

The motor 10 is intended to drive a capstan 34 which, in turn, imparts motion to a flexible web such as a magnetic tape, a belt, or the like. The capstan 34 is supported on an extension 16a of the armature 16 and rotatable therewith.

Commutation for the armature windings 24 is accomplished by armature brush assemblies provided in accordance with this invention. As shown in the drawings, each assembly includes a brush 36 which rides upon and slides against the commutator elements or segments 26 of armature 16. Each brush element has its commutator engaging or operating surface 38 finished in arcuate form to correspond generally to the surface of the commutator. It has been found advantageous to curve the surface 38 on a radius slightly smaller than that of the commutator. This shape permits the brush to ride flat against the commutator in full engagement as it wears in. The brush surface 38 has a length and width sufficient to provide the energy transfer area required for the motor while commonly contacting the proper number of commutator segments 24. As used herein, width means the dimension parallel to the direction of relative motion between the brush and the commutator surface. The dimensions chosen will, of course, depend upon the winding patterns of the aramture and the energy transfer requirements. These factors are well within the skill of the art and need not be discussed herein.

The brush 36 is of very low profile, as shown, so as to have as small mass as possible, a low center of gravity, and a lower center of rotation about its pivoted connection with the holder (to be described later), to minimize transverse loading due to friction between the brush and moving commutator surface. It has been found that, with the supporting means provided by this invention, very little brush wear occurs; and a minimum thickness is required for long brush life, even when a conventional brush material, such as silver graphite, is used.

On the upper surface of the brush 36, a universal pivot joint is provided. This pivot joint couples the brush to its holder for free pivotal movement, within limits, in any direction. Essentially, it consists of a ball and socket. In the embodiment shown in FIGS. 1–4 of the drawings, the joint includes a spherical pivot member 40 mounted on the brush 36. The member 40, which need be nothing more than a steel ball-bearing, is positioned at the center of the upper surface of the brush 36 with its center on an imaginary line extending through the center of the operating surface 38 of the brush, and normal to or forming a radius line of the surface 38. To maintain as low a profile and center of rotation as possible, the ball 40 is inset into a cavity 42 in the surface of the brush 36. It is bonded in place with a suitable bonding material.

The ball 40 connects the brush 36 to an elongated lead spring 44, which forms the brush holder. The spring 44 has a downwardly facing concave socket 46 formed at one end which fits over the ball 40 to form a pivot that will permit pitch, roll, and yaw movements of the brush with respect to the spring 44. It is preferred that the center of rotation of this joint be spaced from the operating surface a distance appreciably less than the width of the operating surface 38 so that the overturning couple produced by the sliding friction at the operating surface produces a minimum side-to-side differential loading at the operating surface. As seen best in FIG. 4, the ball is not wholly retained by the socket 46, and can move downwardly. To prevent disengagement during assembly when the ball is not loaded upwardly into the socket, a retainer clip 48 is provided. This clip 48 includes a cap portion 50 that fits over the top of the brush 36. The cap has depending flanges 52 at its sides which are crimped inwardly against the side surfaces of the brush to secure it in place and to form good electrical contact between cap and brush. An aperture 54 in the cap 52 allows it to be fitted over the ball 40 during assembly. At one end of the cap 52, a retaining flange 56 is provided which extends up and back over the end of the leaf spring. The purpose of this flange is to prevent the brush 36 from falling away from the leaf spring 44 far enough to permit disengagement of the ball 40 and socket 46. As will be apparent from inspection of FIG. 4, there is insufficient clearance between the spring 44 and flange 56 to free the ball 40 from confinement. Again to preserve the low profile and low center of rotation, the flange 56 has a large aperture 58 therein which permits it to be positioned below the level of the socket 46 without interfering with the pivotal connection. As an alternative, the flange 56 could be positioned above the socket and adapted to restrict displacement by engaging the top of the socket. This would, however, raise the effective center of gravity of the device and, for that reason, is not preferred.

A further restraint means is provided on the retaining clip 48 in the form of a finger 60 that extends upwardly from the end of the cap 52 opposite the flange 56. This finger is loosely received in an aperture 62 formed in spring 44 and prevents excessive horizontal rotation (yaw) of the brush with respect to the holder spring 44. A horizontal extension 64 at the top of finger 60 also limits the degree of pitch of the brush, and helps flange 52 to assure its retention in the holder.

Figure 2:
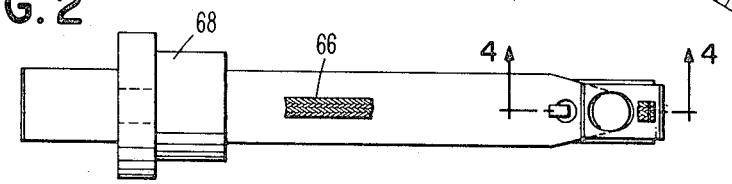
FIG. 2 is a plan view of a brush assembly embodying the invention.
Figure 3:
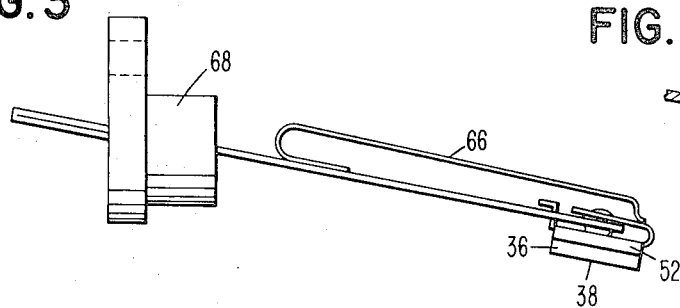
FIG. 3 is an elevation view of the assembly.
Figure 5:
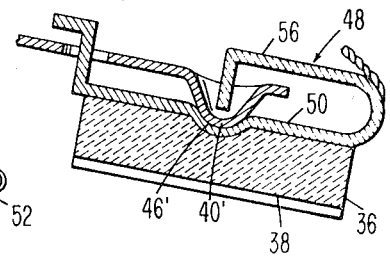
FIG. 5 is a view similar to FIG. 4, but showing a modified form of the invention.
Figure 4:
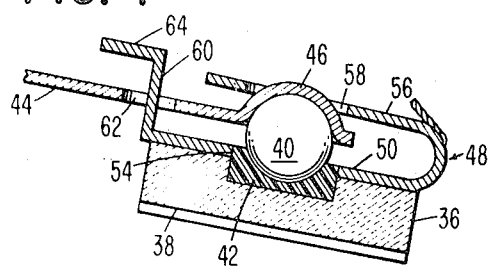
FIG. 4 is an enlarged sectional view taken substantially along the line 4—4 of FIG. 2.

It will be apparent to those skilled in the art that a modified pivot joint meeting the spirit of this invention may be provided, as shown in FIG. 5, by reversing the positions of the ball and socket from those shown in FIGS. 2, 3, and 4. In the embodiment of FIG. 5, the ball member is formed by a downwardly directed convex projection 40' on the spring 44 and a matching concavity 46' in the top surface of the brush 36. This joint operates in the same way as the ball 40 and socket 46, and provides an even lower center of rotation between the parts. The clip 48 is, of course, provided in the same fashion and for the same purpose in this case.

The leaf spring holder 44 is employed as a conductor for brush current, as well as a support. However, since it is difficult to assure effective conduction through the ball and socket pivot joint, a separate conductor 66 is provided between the spring 44 and the clip member 48. This conductor is preferably a flexible, open-wave, braided conductor which is soldered at one end to the spring 44 and at the other end to the flange 52.

The brush and holder assembly just described is intended to be supported on the frame of the motor 10 in the position shown in FIG. 1. A mounting bracket 68 is fixedly secured to the leaf spring 44 near the end remote from the brush 36. The bracket 68 is, in the preferred embodiment, a phenolic body which is actually molded around the spring to form a rigid connection. When the bracket is secured to the frame of the motor, it supports the leaf spring at an angle which would position the brush 36 below the level of the commutator surface. The engagement of the brush with the commutator surface thus flexes the leaf spring somewhat to create a positive pressure, forcing the brush into engagement with the commutator element. This pressure, of course, also loads the ball and socket joint so that the brush is held in a firm pivotal fashion. The brush 36 is, thus, retained against bodily displacement, but is free to pitch, roll, and yaw within reasonable limits as necessary to follow movements of the commutator surface during operation of the motor.

It will be observed that the pivotal connection can only exert force on the brush in a radial direction with respect to the commutator, because of the positioning of the ball 40, so there is no tendency for the brush to twist or cock and wear unevenly. The design disclosed herein, which provides for a low center of rotation and low pivot point, assures avoidance of this undesired activity. The curved shape of the brush operating surface 38, in combination with the loading force exerted by the flexed leaf spring, holds the brush in the proper position at all times.

A great advantage of this invention resides in the fact that the following movements of the brush in the radial direction, caused by out-of-round irregularities of the armature and commutator, are accommodated by flexing the spring 44, so none of the following force is lost in sliding friction between relatively moving parts, as is characteristic of common brushes. Any acceleration of the brush radially outward simply increases the flexure of the spring. Inward radial movements are followed by decreasing the flexure. If the spring is properly selected to have a natural vibration frequency that is high with respect to the frequency of radial motion, as is contemplated by this invention, the following action is extremely faithful, and any tendency for the brush to lift off the commutator is avoided. It has been found that the primary source of significant radial accelerations of the brush is "out-of-round" irregularity of the commutator element. Accordingly, the frequency of substantial radial acceleration to which the brush is subjected is in the order of twice the maximum rotational speed of the commutator element. The natural vibration frequency of the brush assembly should be greater than this to assure proper operation. The extremely low mass of the brush 36 and its associated elements 40 and 48 permits high natural vibration frequencies without requiring undue stiffness of the spring 44. Selection of a spring having flexure forces of the proper order of magnitude to produce light, but uniform, loading over the radial travel required is thus made possible.

It will be appreciated from the foregoing description that this invention provides a commutator brush capable of providing excellent energy transfer to a commutator at very high speeds and associated high radial acceleration and in the presence of substantial rotational irregularities in the commutator surface. For that reason, it is particularly well adapted for use with the modern low inertia motors in which the construction of the commutator element does not provide the trueness and stability necessary with prior art brush arrangements. The brush assembly is, of course, also equally well adapted for use in other environments. The extremely low wear rates that have been found to exist with this construction make it attractive, even when surface characteristics do not demand the exceptional following ability provided.

The brush assembly described herein is generally adapted for a machine subject to bi-directional operation. The positioning of the pivotal connection between the brush and holder is arranged to accommodate bi-directional operation with best wear results. However, if the assembly is to be used in a unidirectional rotating machine, it would be advantageous to relocate the pivot point farther away from the leading edge of the brush (the edge which first encounters commutator segments as they pass) to properly counterbalance the overturning couple produced by friction and evenly distribute the wear. The amount of offset from the brush center will depend upon the magnitude of the couple and can easily be calculated for a given machine.

While the invention has been particularly shown and described with reference to preferred embodiments thereof, it will be understood by those skilled in the art that various changes in form and details may be made therein without departing from the spirit and scope of the invention.

What is claimed is:

1. A commutator brush assembly for a rotating electrical machine which includes a housing and a commutator element rotatably mounted with respect to said housing, said brush assembly comprising:
   (a) a brush of electrically conductive material adapted to engage said commutator element;
   (b) supporting means mounted on the housing and including a brush mounting part movable toward and away from the commutator element and yieldingly urged toward the commutator; and
   (c) pivotal connection means connecting the brush to said brush mounting part for at least limited relative pivotal pitch, roll, and yaw motion with respect to said brush mounting part in any direction.

2. The apparatus defined in claim 1 wherein the pivotal connection means includes a ball and socket joint.

3. The apparatus defined in claim 1 wherein the pivotal connection means is located substantially on a line extending through the center of the operating surface of the brush which engages the commutator element and normal to said operating surface.

4. The apparatus defined in claim 3 wherein the distance from the center of the pivotal connection to the closest point on the operating surface of the brush is less than the dimension of said operating surface parallel to the direction of relative motion between the brush and the commutator element.

5. A commutator brush assembly for a rotating electrical machine which includes a housing and a commutator element rotatably mounted with respect to said housing, said brush assembly comprising:
   (a) a brush of electrically conductive material adapted to engage said commutator element;
   (b) a leaf spring member;
   (c) pivotal connection means connecting said brush to said leaf spring member for at least limited relative pivotal pitch, roll, and yaw motion with respect to said leaf spring member in any direction; and
   (d) means for supporting said leaf spring member at a point thereon remote from said pivotal connection means in fixed relation to said housing, said last named means supporting said leaf spring member at an attitude which produces a flexure in the leaf spring exerting spring pressure on said brush in a direction to force it against the commutator element.

6. The apparatus defined in claim 5 wherein the pivotal connection means includes a ball and socket joint.

7. The apparatus defined in claim 5 wherein the pivotal connection means is located substantially on a line extending through the center of the operating surface of the brush which engages the commutator element and normal to said operating surface.

8. The apparatus defined in claim 5 wherein the pivotal connection includes a substantially spherical element fixed to the brush and a mating concavity formed in the leaf spring at one end thereof.

9. The apparatus defined in claim 5 wherein the pivotal connection means includes a projection on the leaf spring having a rounded end facing toward the brush, and a mating concavity on the adjacent surface of the brush.

10. The apparatus defined in claim 5 wherein the distance from the center of the pivotal connection to the closest point on the operating surface of the brush is less than the dimension of said operating surface parallel to the direction of relative motion between the brush and commutator element.

11. The apparatus defined in claim 5 wherein the natural vibration frequency of the brush assembly is greater than at least twice the maximum rotational speed and commutator element.

12. The apparatus defined in claim 8, including retaining means secured to the brush and extending over the end of the leaf spring adjacent the concavity to prevent disengagement between the spherical element and the concavity.

13. The apparatus defined in claim 8, including an aperture in the leaf spring and finger means secured to the brush and extending through said aperture to limit the extent of pivotal motion between the brush and the leaf spring.

References Cited

UNITED STATES PATENTS 931,415   8/1909   Grant _____ 310—244

MILTON O. HIRSHFIELD, Primary Examiner

L. L. SMITH, Assistant Examiner 930-4008-00D
PO-1050
(5/69)

UNITED STATES PATENT OFFICE
CERTIFICATE OF CORRECTION

Patent No. 3,543,068          Dated Nov. 24, 1970

Inventor(s) G. A. Fisher et al

It is certified that error appears in the above-identified patent and that said Letters Patent are hereby corrected as shown below:

In the claims, Column 6, line 58, the word "and" should read -- of the --.

SIGNED AND
SEALED
FEB 9 1971

(SEAL)
Attest:

Edward M. Fletcher, Jr.
Attesting Officer

WILLIAM E. SCHUYLER, JR.
Commissioner of Patents

Disclaimer 3,543,068.—*Gene A. Fisher, Adolfo M. Guzman, John P. Harris* and *Paul Y. Hu*, Boulder, Colo. COMMUTATOR BRUSH ASSEMBLY. Patent dated Nov. 24, 1970. Disclaimer filed Sept. 23, 1971, by the assignee, *International Business Machines Corporation.*

Hereby enters this disclaimer to claims 1, 2, 3 and 4 of said patent.

[*Official Gazette January 4, 1972.*]